(12) United States Patent
Kaemmerer et al.

(10) Patent No.: US 10,823,279 B2
(45) Date of Patent: Nov. 3, 2020

(54) SPUR GEAR TRANSMISSION

(71) Applicant: VOITH PATENT GMBH, Heidenheim (DE)

(72) Inventors: Steffen Kaemmerer, Immenstadt (DE); Philipp Zemella, Sonthofen (DE); Matthias Rauch, Kempten (DE); Marco Schneider, Oberstaufen (DE)

(73) Assignee: Voith Patent GmbH, Heidenheim (DE)

( * ) Notice: Subject to any disclaimer, the term of this patent is extended or adjusted under 35 U.S.C. 154(b) by 269 days.

(21) Appl. No.: 15/772,156

(22) PCT Filed: Oct. 28, 2016

(86) PCT No.: PCT/EP2016/076006
§ 371 (c)(1),
(2) Date: Apr. 30, 2018

(87) PCT Pub. No.: WO2017/072268
PCT Pub. Date: May 4, 2017

(65) Prior Publication Data
US 2018/0320779 A1    Nov. 8, 2018

(30) Foreign Application Priority Data

Oct. 30, 2015 (DE) .......................... 10 2015 221 234

(51) Int. Cl.
*F16H 57/04*        (2010.01)
(52) U.S. Cl.
CPC ..... *F16H 57/0495* (2013.01); *F16H 57/0421* (2013.01); *F16H 57/0424* (2013.01); *F16H 57/0431* (2013.01); *F16H 57/0461* (2013.01)

(58) Field of Classification Search
CPC ............... F16H 57/046; F16H 57/0458; F16H 57/0424; F16H 57/0423
See application file for complete search history.

(56) References Cited

U.S. PATENT DOCUMENTS 1,220,810 A * 3/1917 Alquist ............... F16H 57/0447
184/6.12
2,214,485 A * 9/1940 Short .................. F16H 57/0421
184/6.12

(Continued)

FOREIGN PATENT DOCUMENTS

CN        102574531 A    7/2012
CN        103080611 A    5/2013
(Continued)

*Primary Examiner* — William Kelleher
*Assistant Examiner* — Gregory T Prather
(74) *Attorney, Agent, or Firm* — Laurence A. Greenberg; Werner H. Stemer; Ralph E. Locher

(57) ABSTRACT

A spur gear transmission has at least two toothed spur gears with toothings that are in meshing engagement with one another and which are each rotatable about an axis of rotation. An enveloping wall at least partially encloses the two spur gears in a circumferential direction and in the direction of the axis of rotation. The enveloping wall has an inner contour adapted to the outer diameters of the spur gears such that, between the enveloping wall and the spur gears, there are formed two ring-shaped gaps which transition into one another, wherein in each case one ring-shaped gap is arranged concentrically with in each case one axis of rotation. A lubricating device conducts a lubricant flow into the toothings of the spur gears. A cooling device is additionally provided, which conducts a coolant flow through one or more cooling ducts within and/or along the outside of the enveloping wall.

22 Claims, 12 Drawing Sheets

(56) References Cited

U.S. PATENT DOCUMENTS

| | | | | |
|---|---|---|---|---|
| 2,523,764 | A * | 9/1950 | Jodry | F16H 57/0498 184/11.1 |
| 2,645,305 | A * | 7/1953 | Roos | F16N 7/18 184/11.1 |
| 3,734,637 | A * | 5/1973 | Beck, Jr. | F04D 13/02 415/122.1 |
| 4,284,174 | A * | 8/1981 | Salvana | F01D 25/18 184/6.26 |
| 5,107,676 | A * | 4/1992 | Hadaway | F01D 25/18 184/6.11 |
| 5,193,645 | A * | 3/1993 | Francois | F16H 57/0412 184/59 |
| 5,205,377 | A * | 4/1993 | Pfarrwaller | D03J 1/003 139/1 R |
| 5,950,501 | A | 9/1999 | Deeg et al. | |
| 6,018,962 | A * | 2/2000 | Dewhirst | F04D 29/063 62/468 |
| 6,374,949 | B2 | 4/2002 | Schwertberger | |
| 7,307,363 | B2 | 12/2007 | Pashnik et al. | |
| 8,739,930 | B2 | 6/2014 | Boenning et al. | |
| 2008/0116010 | A1 * | 5/2008 | Portlock | F16H 57/0479 184/6.12 |
| 2012/0125224 | A1 | 5/2012 | Starbatty | |
| 2013/0025405 | A1 * | 1/2013 | Arisawa | F16H 57/0495 74/606 R |
| 2013/0133454 | A1 * | 5/2013 | Barthel | F16N 7/40 74/468 |
| 2013/0233107 | A1 | 9/2013 | Von Wilmowsky et al. | |
| 2014/0054114 | A1 | 2/2014 | Isomura et al. | |
| 2015/0267918 | A1 | 9/2015 | Maurer et al. | |
| 2017/0089447 | A1 * | 3/2017 | Uesugi | F16H 57/03 |
| 2017/0184193 | A1 | 6/2017 | Kaemmerer et al. | |
| 2018/0073626 | A1 * | 3/2018 | Schilling | F16H 57/0424 57/424 |
| 2018/0262089 | A1 * | 9/2018 | Hatch | F16H 57/0476 |
| 2018/0313443 | A1 * | 11/2018 | Kaemmerer | F16H 57/0436 |
| 2019/0162291 | A1 * | 5/2019 | Gerges | F16H 57/0423 |
| 2019/0301466 | A1 * | 10/2019 | Violet | F02C 7/36 |
| 2020/0172260 | A1 * | 6/2020 | Mueller | F16H 57/0424 |

FOREIGN PATENT DOCUMENTS

| | | |
|---|---|---|
| CN | 103806957 A | 5/2014 |
| CN | 104930544 A | 9/2015 |
| DE | 1147812 B | 4/1963 |
| DE | 3331131 A1 | 3/1985 |
| DE | 19860353 C1 | 6/2000 |
| DE | 102006044498 A1 | 5/2007 |
| DE | 102006022964 A1 | 11/2007 |
| DE | 102007041318 A1 | 3/2009 |
| DE | 102015209403 A1 | 11/2015 |
| EP | 2535618 A1 | 12/2012 |
| GB | 292540 A | 9/1928 |
| GB | 458379 A | 12/1936 |
| GB | 1426352 A | 2/1976 |
| JP | 2011163365 A | 8/2011 |
| WO | 2012028231 A1 | 3/2012 |
| WO | 2015177332 A1 | 11/2015 |

* cited by examiner

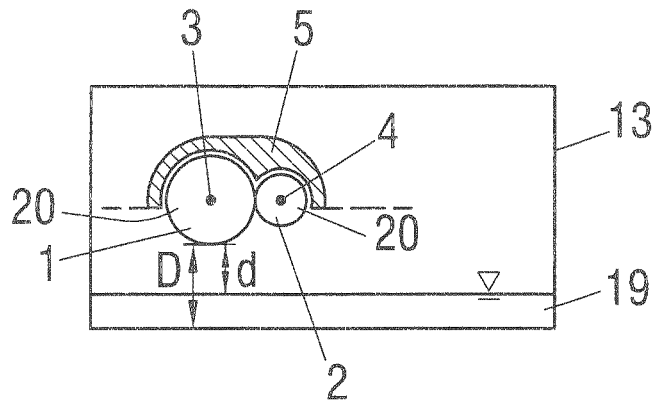
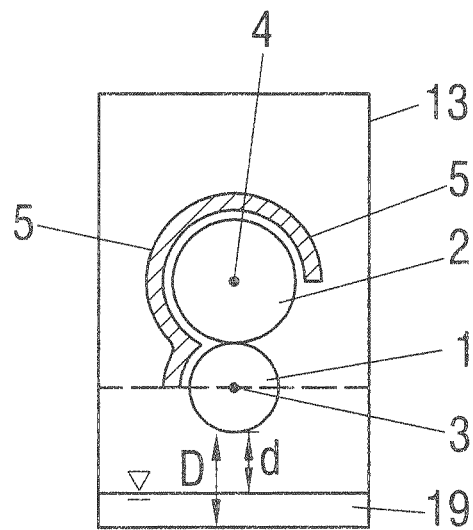
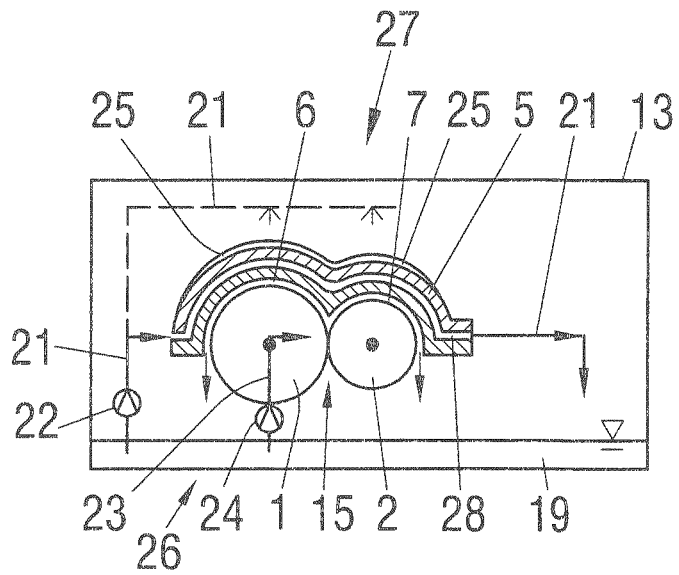

SPUR GEAR TRANSMISSION

BACKGROUND OF THE INVENTION

Field of the Invention

The present invention relates to a spur gear transmission having at least two toothed spur gears, specifically spur gear transmission with toothed spur gears, the toothings of which are in meshing engagement with one another and which are each rotatable about an axis of rotation; having an enveloping wall which at least partially encloses the two spur gears in a circumferential direction and in the direction of the axis of rotation; wherein the enveloping wall has an inner contour which is adapted to the outer diameters of the spur gears such that, between the enveloping wall and the spur gears, in particular between the enveloping wall and the two intermeshing spur gears, there are formed two ring-shaped gaps which transition into one another, wherein in each case one ring-shaped gap is arranged at least substantially concentrically with respect to in each case one axis of rotation; and having a lubricating device for conducting a lubricant flow into the toothings of the spur gears.

Spur gear transmissions of the generic type are known for example from WO 2012/028231 A1. Spur gear transmissions of said type are designed for example as high-speed transmissions, such as turbo transmissions.

In particular in the case of such high-speed transmissions such as turbo transmissions, undesirable losses arise owing to the swirling of the air-oil mixture in the interior space of the transmission housing. Various measures are known for reducing the losses. One measure provides applying a vacuum in the interior space of the transmission housing by means of a vacuum pump, such that the pressure in the interior space is lower than that of the surroundings outside the transmission housing.

Another measure, which is intended to avoid such application of a vacuum in the transmission housing, is presented in WO 2012/028231 A1 as cited in the introduction, specifically the provision of an enveloping wall situated in a closely fitting manner around the spur gears, which enveloping wall encloses the spur gears in a circumferential direction with the exception of an inlet gap and possibly an outlet gap, which is positioned outside the outer circumference of the spur gear. This encapsulation of the spur gears with the enveloping wall was also provided for generating a negative pressure in the region of the outer diameter of the spur gears or in the region of the toothings thereof, which negative pressure reduces the losses.

Both known measures are therefore based on the assumption that as low a pressure as possible, that is to say as intense a vacuum as possible, must be generated in the region of the rotating toothings of the spur gears in order to reduce the power losses. Therefore, correspondingly complex measures for extensive sealing, or relatively high-powered and therefore expensive and energy-intensive vacuum pumps, have been provided in order to optimize the vacuum to the greatest possible extent. These measures are associated with undesired costs.

DE 198 60 353 C1 discloses a spur gear transmission in which the spur gears are enclosed by an additional inner housing which is fastened within a main housing. A partial vacuum is generated in the interior space of the inner housing by means of a pump. The space between the inner housing in the main housing is at atmospheric pressure. The spur gears do not project outward from the inner housing, but are rather enclosed by the latter with a spacing, such that there are also no resulting ring-shaped gaps that transition into one another.

DE 10 2006 022 964 A1 describes a fluid equalization container and a transmission equipped therewith. The fluid equalization container encloses the spur gears laterally over a part of their circumference.

DE 10 2007 041 318 A1 describes a transmission having a toothed-gear pump, wherein the toothed-gear pump is an external toothed-gear pump and has two intermeshing toothed gears, one of which belongs to one of the gear sets in the transmission. To form a pump gap, an additional housing is provided below the toothed gears, which additional housing extends partially over the circumference of the toothed gears.

GB 292 540 A describes toothed gears which rotate at high rotational speed in a housing and which are assigned a special guide for improving the lubrication of the toothed gears. The guide partially encloses the toothed gears and is closed at the underside at least such that the toothed gears do not project out of the guide.

GB 1 426 352 A describes a lubricating device for toothed gears, in the case of which a partially open inner housing is likewise provided which encloses the toothed gears at their underside and at one lateral side in a closely fitting manner.

GB 458 379 A discloses an air pump which is integrated into a transmission. The air pump has arcuate guide structures which enclose the toothed gears at their face sides.

US 2014/0054114 A1 discloses a lubricating oil supply for a transmission, in the case of which a cover fully encloses the pinion of two spur gears and encloses the other toothed gear of the two spur gears over half of the circumference.

U.S. Pat. No. 5,950,501 A presents a spur gear transmission, the inner housing of which surrounds the spur gears with a certain spacing and is evacuated by means of a pump or filled with a gas. No ring-shaped gaps which transition into one another are provided, and the spur gears do not project out of the inner housing.

U.S. Pat. No. 2,645,305 A describes a lubricating device for spur gears of a transmission with a lateral shield for the spur gears, which shield projects only over a small part of the outer circumference of the spur gears.

EP 2 535 618 A1 discloses spur gears which are enclosed by housings but which do not project out of the housings.

WO 2012/028231 A1 discloses a toothed-gear transmission having an enveloping wall which encloses at least one of two interacting toothed gears and which partially or completely closes off the enclosed interior space with respect to the surroundings. The toothed gears do not project out of the enveloping wall.

JP 2011-163365 A discloses a toothed-gear transmission having an oil duct which partially follows the shape of the toothed gears.

DE 33 31 131 A1 discloses a double-walled housing of an axle transmission, such that the housing can be connected to a coolant circuit and a cooling jacket can be realized in the housing.

For a hybrid transmission, it is already known from DE 10 2006 044 498 A1 for pipes to be led over the outer circumference of a stator and for the stator to be cooled by being sprinkled from said pipes.

In the case of a design from U.S. Pat. No. 2,214,485, an air-oil mixture is generated in a transmission housing, which mixture is used for lubrication purposes.

In all known spur gear transmissions of the generic type, the heat losses that arise in the toothing during operation are dissipated predominantly by means of a lubricant which simultaneously serves for lubricating the tooth engagement region of the intermeshing toothings in order to thereby minimize a degree of wear of the toothings. If the surroundings of the spur gear transmission are at a correspondingly lower temperature than the region around the spur gears, it is self-evident that a certain amount of heat dissipation will also occur by free convection. This heat dissipation is however negligible in relation to the heat dissipated by means of the lubricant.

It is basically the case that, the more lubricant is introduced into the toothings or into the meshing engagement of the toothings, the more heat can be dissipated from the region of the toothings by means of the lubricant. In particular in the case of high-speed transmissions such as turbo transmissions, such as that to which the present invention according to one embodiment relates, it is however the case that, with increasing lubricant volume introduced into the toothing, the power losses are also considerably increased. Thus, a reduction of the temperature loading of the components through introduction of a greater lubricant flow simultaneously entails an increase of the power losses.

SUMMARY OF THE INVENTION

The present invention is therefore based on the object of further developing a spur gear transmission of the type mentioned in the introduction such that both a high level of efficiency and low temperature loading of the components are achieved.

The object of the invention is achieved by means of a spur gear transmission, which can also be referred to as a torque/rotational speed conversion device, in particular a rotational speed/rotational speed conversion device, between at least one driving shaft and one driven shaft, having the features as claimed. The dependent claims specify advantageous and particularly expedient embodiments of the invention.

A spur gear transmission according to the invention has at least two toothed spur gears, the toothings of which are in meshing engagement with one another, wherein the spur gears, in particular the two spur gears, are each rotatable about an axis of rotation. The spur gear transmission has an enveloping wall which at least partially encloses the two spur gears in a circumferential direction and in the direction of the axis of rotation, wherein the enveloping wall has an inner contour which is adapted to the outer diameters of the spur gears such that, between the enveloping wall and the spur gears, in particular between the enveloping wall and the two intermeshing spur gears, there are formed two ring-shaped gaps which transition into one another, wherein in each case one ring-shaped gap is arranged at least substantially concentrically with respect to in each case one axis of rotation.

According to the invention, the spur gear transmission is equipped both with a lubricating device, which is designed to conduct a lubricant flow into the toothings of the spur gears, and additionally with a cooling device, which is designed to conduct a coolant flow through one or more cooling ducts, which run within the enveloping wall, and/or along the outside of the enveloping wall.

According to the invention, it is thus no longer necessary for a large heat flow to be dissipated from the enveloping wall by means of the lubricant, it rather being the case that a generally at least equally large heat flow or advantageously a larger heat flow, in particular considerably larger heat flow, can be dissipated from the enveloping wall by means of the cooling device, that is to say by means of the coolant flow. This in turn makes it possible for the lubricant flow to be configured to be relatively small, such that the power losses are reduced. In particular, the lubricant flow is thus smaller than the coolant flow, and in particular, the coolant flow amounts to a multiple of the lubricant flow, for example at least two times, five times or ten times the lubricant flow.

In one particularly advantageous embodiment of the invention, the cooling device comprises a sprinkling device by means of which the coolant flow can be sprinkled or sprayed onto the enveloping wall from the outside.

It is particularly advantageous if the enveloping wall has, on its outer side, webs which laterally delimit a flow path of the coolant flow, specifically laterally in relation to the flow direction of the coolant flow over the outer side of the enveloping wall. Said webs may, according to a first embodiment, be formed integrally on the enveloping wall, or else may, according to a second embodiment, be formed by separate components that are connected to the enveloping wall. The connection may be realized by non-positive locking, positive locking or cohesion, and may be of detachable or non-detachable form.

For example, the cooling device has at least one, advantageously two, coolant-conducting pipe(s) which run(s) along the outer side of the enveloping wall and which has/have (in each case) a multiplicity of outlet openings which are positioned spaced apart from one another and which serve for dispensing the coolant flow onto the outside of the enveloping wall in a distributed manner.

To optimize the lubrication and the cooling of the spur gear transmission equally, a mass and/or volume flow of the coolant flow of the cooling device and of the lubricant flow of the lubricating device can advantageously be set separately from one another and in particular independently of one another, such that each of the two flows can be set with a different constant value or controllable value, that is to say in particular a value which is variable during operation.

In one embodiment of the invention, provision may be made for a medium other than the lubricant to be used as coolant, for example for water or a water mixture to be used as coolant and for oil to be used as lubricant.

In another embodiment of the invention, the coolant flow comprises a first oil volume flow and the lubricant flow comprises a second oil volume flow, which are delivered out of a common oil reservoir, in particular an oil sump in the spur gear transmission, or out of mutually separate oil reservoirs.

In one advantageous embodiment of the invention, the enveloping wall comprises at least one cooling duct which runs at least partially in the direction of the axes of rotation and/or at an angle, in particular at right angles, with respect thereto within the enveloping wall and which, in terms of its profile, follows the inner contour of the enveloping wall at least in sections.

In one embodiment of the invention, the enveloping wall has a heat-conducting, in particular solid part which forms the inner contour, and has a heat exchanger which is connected to said part externally or which integrally adjoins said part and in which the at least one cooling duct is formed.

The heat exchanger may for example be designed as a plate-type heat exchanger or as a pipe bundle heat exchanger.

To reduce a flow speed of the coolant flow on the outer side of the enveloping wall, that is to say on an outer surface which is flowed over by the coolant flow, the enveloping wall, on its outer side in a region flowed over by the coolant flow, is advantageously equipped with a profiled surface.

The surface profiling may be formed for example by means of a staircase-like structure or steps and/or depressions. In the case of a staircase-like design, the coolant flow flows in a stepped manner along the staircase-like structure on the outer side of the enveloping wall from top to bottom. Steps act in the manner of a dam, which is flowed over when its peak is reached.

It is particularly expedient if the coolant flow runs off freely into an oil sump positioned below the enveloping wall, in particular in embodiments in which the coolant flow is applied at least inter alia to the outer side of the enveloping wall. It is however also possible in principle for the coolant to flow off freely from the at least one cooling duct in the enveloping wall into the oil sump.

The webs that are advantageously provided in the enveloping wall may be elevated in a radial direction of the axes of rotation relative to an outer surface, which is flowed over by the coolant flow, of the enveloping wall in such a way that said webs prevent a flow of coolant over face sides, facing in the direction of the axis of rotation, of the enveloping wall. This has the advantage that the coolant cannot pass into rotating regions of the spur gear transmission, which would result in corresponding power losses.

In one embodiment of the invention, in a region, flowed over by the coolant flow, of an outer surface of the enveloping wall, a maintenance opening is provided which is enclosed by shaft-like side walls which project from the outer surface, such that an ingress of the coolant flow into the maintenance opening is prevented. In the case of at least one coolant-conducting pipe being provided which runs on the outer side of the enveloping wall and which has outlet openings, the side walls advantageously project at least as far as the top side, that is to say the upper outer diameter of the pipe. In the case of webs being provided on the enveloping wall, the shaft-like side walls advantageously project at least as far as the upper ends of the webs.

In one embodiment, the maintenance opening is closable, in particular by means of a removable or pivotable cover. This is however not imperative.

The cooling device advantageously ensures uniform wetting of the enveloping wall or of at least a part of the outer surface of the enveloping wall with coolant. If a pipe with outlet openings is provided, said pipes have, in one embodiment, a constant spacing to one another, for example between 10 and 40 mm, in particular 15 to 25 or 20 mm. A diameter of the openings may be for example 3 mm. In an alternative embodiment, the spacing of the outlet openings and/or of the cross section of the outlet openings vary, in a manner dependent on the respective local production of heat at the corresponding position on the outer side of the enveloping wall.

To provide the enveloping wall with at least one cooling duct or advantageously a multiplicity of cooling ducts, the enveloping wall is, in one advantageous embodiment, produced from hollow profiles. In the case of such hollow profiles, the cross-sectional area of the at least one cooling duct is advantageously larger than the cross-sectional area of the walls of the enveloping wall surrounding the cooling duct, that is to say larger than the cross sectional area of the "solid" material of the enveloping wall. This is however not imperative. For example, the at least one cooling duct may also in a adjoin a solid region of the enveloping wall which exhibits relatively good heat conductivity.

In one particularly advantageous embodiment, the enveloping wall encloses the two spur gears in a circumferential direction only over a part of the circumference thereof, such that a part of the outer circumference of the two spur gears or of at least one of the two spur gears projects outward from the enveloping wall. This part of the circumference which projects out of the enveloping wall is thus exposed to the surroundings of the enveloping wall, for example to an interior space of a transmission housing of the spur gear transmission. Accordingly, complete encapsulation of the spur gears as in the cited prior art is not provided. If the two spur gears are positioned adjacent to one another, that part of the circumference which projects out of the enveloping wall is situated outside a projection surface formed by a cross section, perpendicular to the axis of rotation of the spur gears, through those parts of the enveloping wall which are positioned along the outer circumference of the spur gears. In other words, not only does the enveloping wall have an opening over the circumference of the spur gears, through which opening the spur gears have, as it were, a line of sight to the surroundings of the enveloping wall, but also, the spur gears actually project out of a corresponding opening of the enveloping wall and protrude beyond said opening. If the two spur gears are positioned one above the other, the lower spur gear correspondingly projects downward beyond a horizontal plane in which the enveloping wall extending downwardly from the upper to the lower spur gear ends.

That part of both spur gears, or of the one spur gear, which projects out of the enveloping wall is advantageously positioned at the underside of the spur gears, that is to say, during the operation of the spur gear transmission, in the direction of an oil sump that accumulates at the bottom in the spur gear transmission under the action of gravitational force. By contrast, on their oppositely situated upper side, the spur gears are advantageously fully enclosed by the enveloping wall, in particular over at least the upper half of the circumference of the respective spur gear, wherein the upper half is terminated in the downward direction in particular by a horizontal line, that is to say the enveloping wall ends, at its underside, in a horizontal plane. If the spur gears are positioned one above the other, wherein in particular exactly two spur gears are provided, of which one is positioned above the other, it is for example possible for the lower spur gear to be enclosed, proceeding from at least substantially the level of its axis of rotation or below the latter, over an arc of at least approximately at least 90°, and the upper spur gear is then advantageously enclosed by the enveloping wall over more than 180°, in particular over substantially 270°, proceeding from adjacent to the engagement region of the two toothings and, over the further course, upward across the peak of the upper spur gear to the opposite side and down again at least substantially to the height of the axis of rotation of the upper spur gear.

That part of the spur gears which projects downward out of the enveloping wall, or in the case of the spur gears being positioned one above the other, that part of the lower spur gear which projects out downward, is advantageously positioned freely above an oil sump in the transmission, in particular with a spacing to the oil sump or to a lower wall of the transmission housing, wherein the spacing advantageously amounts to a multiple of the spacing between the enveloping wall and the enclosed region of the one or more spur gears.

The invention can however also be used, with the corresponding measure, in a transmission in which an oil sump is provided outside the transmission or a corresponding oil sump can be omitted by means of some other suitable lubrication arrangement.

By contrast to the design of toothed-gear pumps, for example, which commonly also have two intermeshing gearwheels which are enclosed in closely fitting fashion, it is the case in the present invention that the intermeshing gearwheels advantageously do not dip into a liquid surface, in particular oil surface, or into a corresponding liquid or oil reservoir.

The two spur gears are advantageously positioned with their axes of rotation adjacent to one another in a horizontal direction of the spur gear transmission, wherein the axes of rotation run in particular within a common horizontal plane. The plane is in particular parallel to the surface of an oil sump at the bottom in the spur gear transmission. An arrangement of the axes of rotation in a plane inclined with respect to a horizontal plane is however also conceivable.

The enveloping wall advantageously fully encloses the two spur gears over their upper half and additionally over a part of the lower half, as viewed in a cross section through a vertical plane perpendicular to the axis of rotation of the spur gears. Those two parts of the envelopment which go beyond the upper half may in particular be designed to be tapered in cross section at their free end.

In one advantageous embodiment of the advantageous embodiment of the enveloping wall with an only partial enclosure of the spur gears in a circumferential direction, the gap or ring-shaped gap between the envelopment and the outer diameter of the spur gears is of tapered design, in particular wedge-shaped tapered design, at at least one free end of the envelopment. This may be provided at one free end or at both free ends of the envelopment. Such a reduction of the ring-shaped gap relative to the remaining region of the ring-shaped gap gives rise to a sealing action, which prevents or reduces undesired escape and/or ingress of oil into the ring-shaped gap.

In one embodiment, the region of the meshing engagement of the spur gears, in particular on the top side of the two spur gears, is free from an envelopment, or a corresponding window is provided in the envelopment for inspection purposes.

The illustrated embodiment is based on the realization that not only a reduction of power losses can be effected through the generation of a negative pressure or vacuum in the region of the toothings of the rotating spur gears, but also, in practice, a thin layer of lubricant-depleted, in particular lubricating-oil-depleted medium forms around the spur gears, because the lubricant, in particular the oil, is flung outward by the centrifugal force. Such a layer or stratification is stabilized by means of the enveloping wall, wherein, through targeted selection of the thickness of the ring-shaped gaps, it can be ensured that relatively oil-rich medium can be present outside the enveloping wall, whereas an oil-depleted medium is present within the enveloping wall, that is to say in the ring-shaped gaps between the spur gears and the enveloping wall. Thus, even without complete encapsulation or without an applied vacuum, a situation in which lubricant-rich medium passes to the spur gears, which medium must be accelerated and thus increases the power consumption of the spur gears, is prevented.

It is not ruled out that a negative pressure is additionally applied in the interior space of the transmission wall that encloses the enveloping wall, that is to say a lower pressure prevails in the interior space than in the surroundings of the transmission housing. Such a negative pressure may be generated for example by means of an external or integrated vacuum pump, the suction side of which is connected to the interior space. With such a reduced surroundings pressure of the enveloping wall, the power consumption can be reduced yet further by means of the partially encapsulated inner housing, that is to say with the enveloping wall according to the invention. Even in relation to an embodiment with an interior space of the transmission housing in which a vacuum is applied and without encapsulation of the spur gears, that is to say without the provision of an enveloping wall, the power losses of the embodiment according to the invention with partial or complete encapsulation of the spur gears, wherein the latter will be discussed in detail further below, and additionally with a pressure-reduced interior space of the transmission housing are lower, specifically because, conventionally, owing to the relatively low density of the medium in the transmission housing, stratification as has been described above occurs only to a small extent, and thus the oil-rich medium can reach the toothings of the spur gears more easily. By means of the enveloping wall provided according to the invention, the stratification of the media is artificially set and intensified, even in the presence of a pressure in the interior space of the transmission housing which lies below the ambient pressure.

In one embodiment of the invention, a spur gear transmission having at least two toothed spur gears is provided, the toothings of which are in meshing engagement with one another, wherein the two spur gears are each rotatable about an axis of rotation. Here, too, an enveloping wall is provided which encloses the two spur gears in the direction of the axes of rotation, wherein the enveloping wall has an inner contour which is adapted to the outer diameters of the spur gears such that two ring-shaped gaps which transition into one another are formed between the enveloping wall and the spur gears, wherein in each case one ring-shaped gap is arranged at least substantially concentrically with respect to in each case one axis of rotation. The enveloping wall may now fully or else only partially, the latter as per the embodiment of the invention presented above, enclose both spur gears jointly in a circumferential direction. At any rate, it is however the case in the further advantageous embodiment that, in addition to the provision of the enveloping wall, the interior space of a transmission housing in which the spur gears are arranged together with the enveloping wall is provided with a pressure which is reduced in relation to the surroundings pressure, that is to say the pressure in the outer surroundings of the spur gear transmission outside the transmission housing.

In particular, between the transmission housing and a part or the entire circumference of the enveloping wall, a spacing is provided which is formed by the interior space. In the interior space, at least during the operation of the spur gear transmission, an air-lubricant mixture, in particular an air-oil mixture, is present, the pressure of which is reduced for example by means of an external or integrated vacuum pump.

In an advantageous embodiment of the invention with partially encapsulated spur gears, that part of the outer circumference of the two spur gears which projects out of the enveloping wall extends over an arc of each case 10° to 180°, in particular of 90° to 180°, including or excluding the boundary values.

For example, that part of the spur gears which projects out of the enveloping wall is positioned at the underside of the spur gears in relation to the intended use of the spur gear transmission.

The ring-shaped gaps may for example have a thickness of 1 to 10 mm, at least in the part in which the inner contour of the enveloping wall and the outer diameter of the spur gears are equidistant or concentric with respect to one another. If, in the free end regions of the enveloping wall, wedge-shaped taperings of the gap are provided in a circumferential direction as viewed radially around the spur gears, the gap thickness in said region is reduced in relation to the region mentioned above, or a gap is even eliminated entirely.

The enveloping wall preferably has, in an axial direction, at least an extent which corresponds to the axial extent of the spur gear that is to be partially enclosed so as to form a ring-shaped gap. An extent beyond this in an axial direction is also conceivable.

It is particularly advantageous if, in accordance with a first embodiment, the enveloping wall is at least partially, preferably entirely, of laterally open form. In this case, the enveloping wall is formed as a wall arranged so as to be spaced apart in a circumferential direction from the outer diameter of the spur gears, that is to say so as to be free from side surfaces or side covers which are arranged in an axial direction as viewed in relation to the spur gear and which are coupled to that part of the enveloping wall which runs in the circumferential direction around the respective spur gear.

In the case of an at least partially laterally open form of the enveloping wall, the latter may be formed by a wall region running in a circumferential direction around the respective spur gear and by lateral wall regions coupled to or formed integrally with the aforementioned wall region. The lateral wall regions then extend, from the wall region running in the circumferential direction around the respective spur gear, in a radial direction in the direction of the axis of rotation of the respective spur gear, preferably only over a region in the range of the outer diameter of the respective spur gear. The lateral wall regions are each arranged spaced apart from the face sides of the spur gear. The lateral wall regions may in this case be formed in one piece with the wall region running in the circumferential direction around the respective spur gear, or else may be formed as separate components which are connected to the aforementioned wall region so as to form the enveloping wall. The connection may be realized by non-positive locking, positive locking or cohesion. In both cases, oil is prevented from being conducted close to the toothed gears, and a lateral passage into the housing is permitted.

In an advantageous refinement, so-called side panels may be provided spaced apart in an axial direction from the wall region running in a circumferential direction around the respective spur gear and thus also from the spur gears themselves that are to be partially enclosed in the circumferential direction by the enveloping wall, which side panels have no connection or coupling to the wall region running in the circumferential direction around the respective spur gear. The object of said side panels consists substantially in preventing a passage of lubricant from the bearing region of the toothed gears into the enveloping wall, in particular into the gap between toothed gear and enveloping wall. Said side panels are preferably designed such that, viewed in the radial direction of the toothed gear, they also cover that part of the outer circumference of the respective spur gear which projects out of the enveloping wall, on the face side of said spur gear. If the projecting part is positioned at the underside of the spur gears, this means that the one or more side panels extend(s) further downward than the enveloping wall.

In a second embodiment, which is an alternative to this, there may be connected to the enveloping wall, on each face side of the spur gears, a side cover which covers the face side, wherein the side cover in particular also covers that part of the outer circumference of the respective spur gear which projects out of the enveloping wall, on the face side of said spur gear. If the projecting part is positioned at the underside of the spur gears, this means that the one or more side covers extend(s) further downward than the enveloping wall.

In this alternative embodiment with side covers, each spur gear may have at least one driving shaft or driven shaft, which is led through at least one of the side covers.

In a further possible design of the alternative embodiment with side covers, an opening is provided in at least one side cover or in both side covers in the region of the mutual engagement of the toothings of the two spur gears. Said opening may for example serve for the discharge of lubricant from that region of the spur gears which is enclosed by the enveloping wall, or from the ring-shaped gaps.

The lubricant for the spur gears may for example be sprayed into the tooth entry point or preferably tooth exit point of the intermeshing toothings. Corresponding nozzles may be provided there for this purpose.

In one advantageous implementation of the embodiment with partial encapsulation, the enveloping wall is, at at least one circumferential end or at both circumferential ends in a circumferential direction of the spur gears, of wedge-shaped tapered design. The formation of a wedge at the circumferential ends has the effect that the flow of the air-lubricant mixture is conducted away from the toothings of the spur gears in a radial direction. A situation is thus prevented in which lubricant-rich medium is drawn into the ring-shaped gap. The wedges serve, so to speak, as a seal for sealing off the ring-shaped gap with respect to the surroundings or with respect to the interior space of the transmission housing. It should be noted here that the spur gears generally rotate toward one another in the region of their circumference covered by the enveloping wall and rotate away from one another in the region of the circumference not covered by the enveloping wall.

The thickness of the ring-shaped gaps is advantageously selected such that a radial speed component of the medium flowing in the ring-shaped gap is reduced. Medium that has already been accelerated in the circumferential direction is intended, by means of the shape of the inner contour of the enveloping wall, to have the most constant possible speed. At the same time, the thickness of the wing-shaped gaps should not be selected to be too small because, with decreasing thickness, the relative speeds in the medium increase, and thus the losses increase.

A spur gear transmission may be formed as a two-shaft or multi-shaft spur gear transmission. In the latter case, a multiplicity of spur gears that are rotatable about in each case one axis of rotation are provided. Each of the spur gears is in meshing engagement with at least one other of the spur gears. The enveloping wall is formed so as to run around at least a partial region of each of the spur gears, wherein the axes of rotation of individual or all spur gears are arranged in a common parting joint of the transmission housing. In this case, the enveloping wall preferably extends, in an installed position of the transmission, in an axial direction from a first, axially outer spur gear, around the outer circumference of the spur gear configuration so as to form ring-shaped gaps between the inner circumference of the enveloping wall and the individual spur gears, to the second spur gear, which is the outer spur gear in the axial direction.

The enveloping wall may, depending on transmission configuration, be of single-part or multi-part form, wherein the individual enveloping wall parts are connected to one another in non-positively locking, positively locking or cohesive fashion.

In an alternative embodiment, the enveloping wall is formed by a multi-part housing which comprises at least two housing parts which are arranged spaced apart from one another, so as to form a gap, along a theoretical parting joint and which are mounted in each case separately in/on a transmission housing that accommodates the spur gear transmission, so as to form the enveloping wall functional unit. In this case, the housing preferably comprises at least one upper part and one lower part which are arranged spaced apart from one another in the region of the theoretical parting joint so as to form a gap and so as to be free from a connection to one another, wherein the theoretical parting joint extends partially or entirely substantially within a plane in which one of the two axes of rotation runs or both axes of rotation run.

In the embodiments, the spur gears do not run in the oil sump, that is to say the transmission configuration does not involve any direct contact of the spur gears with the oil sump. Even in the case of a multi-shaft design, at least one of the spur gears project at least partially out of the enveloping wall.

In one advantageous application, a spur gear transmission according to the invention integrates driving and/or driven assemblies to form a machine train by connection to the individual shafts connected to the spur gears, so as to form a geared turbomachine. Steam turbines, gas turbines, expanders and engines are possible individually or in combination as driving assemblies, and compressors and generators are possible individually or in combination as driven assemblies. The geared turbomachines are thus formed as a geared compressor or expander installation or a combination of both. In general, a complete geared turbomachine is formed as a train, wherein, via the transmission, the driving and driven assemblies, in particular steam turbines, gas turbines, expanders and engines and compressors, interact with one another in terms of process technology in a manner dependent on the design of the geared turbomachine.

The invention will be described by way of example below on the basis of an exemplary embodiment and the figures.

BRIEF DESCRIPTION OF THE DRAWING

FIG. 3 shows a schematic illustration of a possible partial encapsulation of the spur gears with a transmission housing surrounding the latter;

FIG. 4 shows an alternative embodiment in relation to FIG. 3, in which the spur gears are positioned one above the other;

FIG. 5 shows a schematic illustration with the separation of the cooling and lubrication of the spur gears or of the toothings thereof;

DESCRIPTION OF THE INVENTION

Figure 1:
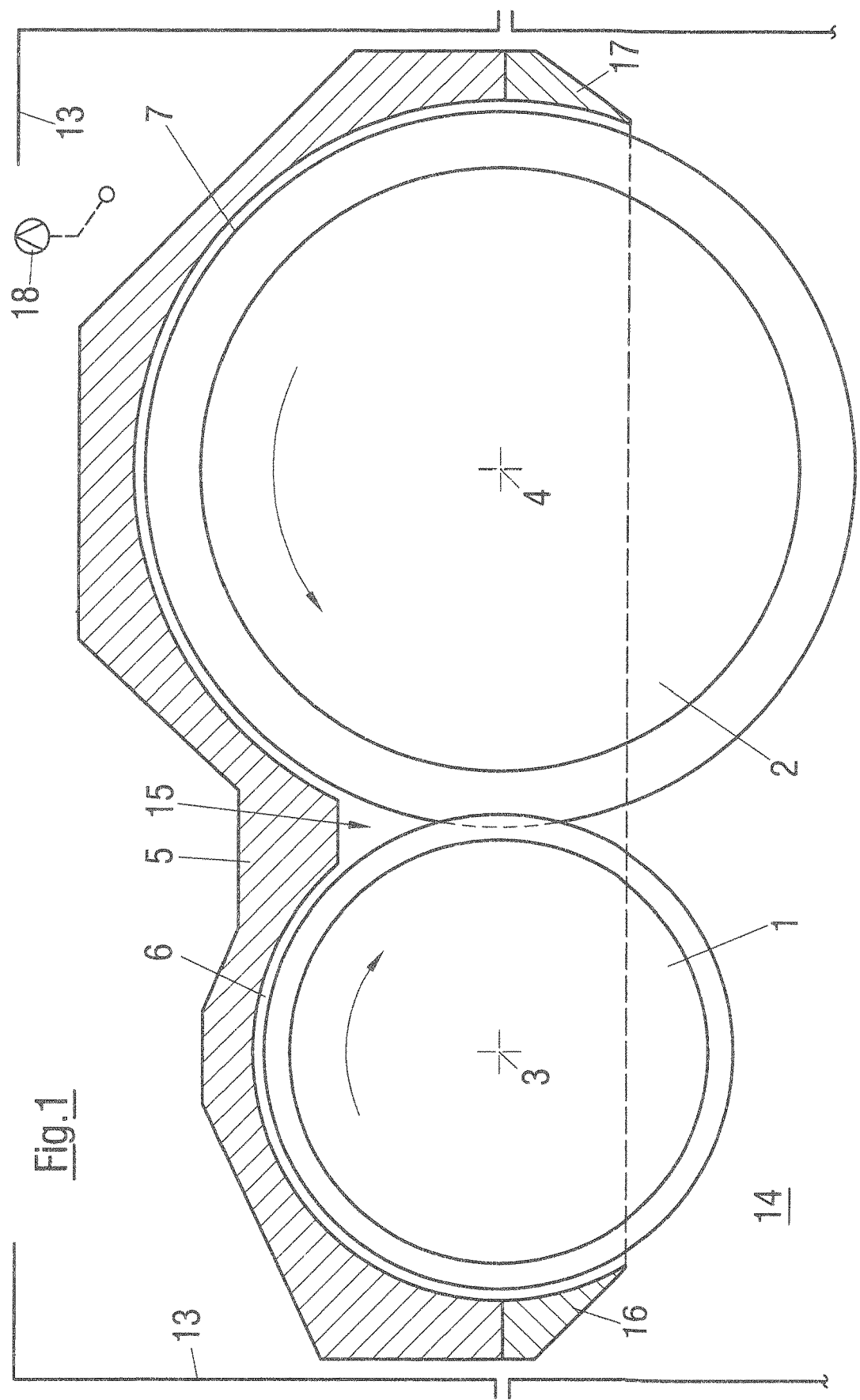
FIG. 1 shows a schematic axial section through a spur gear transmission design according to the invention with partial encapsulation.

FIG. 1 illustrates a spur gear transmission having a first spur gear 1 and a second spur gear 2, which are designed for example as helically toothed or double helically toothed spur gears. As can be seen, the toothings of the two spur gears 1, 2 are in meshing engagement with one another, such that the first spur gear 1, if it rotates about its axis of rotation 3, drives the second spur gear 2 about its axis of rotation 4, or vice versa. The direction of rotation of the spur gears 1, 2 is indicated by the arrows.

An enveloping wall 5 is provided which encloses the spur gears 1, 2 in a closely fitting manner, wherein the enveloping wall 5 extends only over a part of the circumference of the two spur gears 1, 2, such that a part of the outer circumference of the spur gears 1, 2 is exposed to an interior space 14 of the in this case only schematically illustrated transmission housing 13. In the exemplary embodiment shown, the part of the outer circumference of the two spur gears 1, 2 projects out of the enveloping wall 5 at the bottom side of the spur gears 1, 2.

In the remaining region of the circumferences of the two spur gears 1, 2, the inner contour of the enveloping wall 5 forms, together with the outer diameters of the spur gears 1, 2, two ring-shaped gaps 6, 7 which transition into one another, which ring-shaped gaps have a constant thickness of the circumference of the spur gears 1, 2 aside from in the engagement region 15 of the toothings.

In the exemplary embodiment shown, that part of the outer circumference of the two spur gears 1, 2 which project out of the enveloping wall 5 extends in each case over an arc of approximately 180°, wherein the difference in relation to 180° is covered by two wedges 16, 17 at the two circumferential ends of the enveloping wall 5, that is to say the enveloping wall 5 is of wedge-shaped tapered design at its two circumferential ends. As is conceivable on the basis of the illustrated directions of rotation of the spur gears 1, 2, said wedge-shaped tapering causes a diversion of the flow in a radial direction away from the spur gears 1, 2 in the region in which the spur gears 1, 2 enter into the enveloping wall 5.

The projection surface out of which the two spur gears 1, 2 project is delimited by the dashed line and by the enveloping wall 5 that is shown in the cross section. As can be seen, the enveloping wall 5 not only simply has an opening at the bottom through which the spur gears 1, 2 are visible from the outside, but rather the spur gears 1, 2 project with their outer circumference out of the enveloping wall 5. Within the interior space 14, a lubricant sump or oil sump may be provided in the transmission housing 13 at the bottom, which oil sump is not illustrated in any more detail here because it has a corresponding spacing to the underside of the spur gears 1, 2. Furthermore, a suction apparatus, that is to say a vacuum pump, may be provided which is connected with its suction side to the interior space 14 in order to apply a vacuum to the latter. A vacuum pump of said type is illustrated merely schematically, and is denoted by the reference designation 18. The invention may however also be implemented without a vacuum pump of said type.

In the embodiment as per FIG. 1, it is in particular the case that no side covers connected to the enveloping wall 5 are provided. Rather, the spur gears 1, 2 are enclosed by the enveloping wall 5 only over their outer circumference. In the embodiment as per FIG. 2, the enveloping wall 5 from the embodiment as per FIG. 1 is combined with side covers 8, 9, wherein this is however not imperative.

Figure 2:
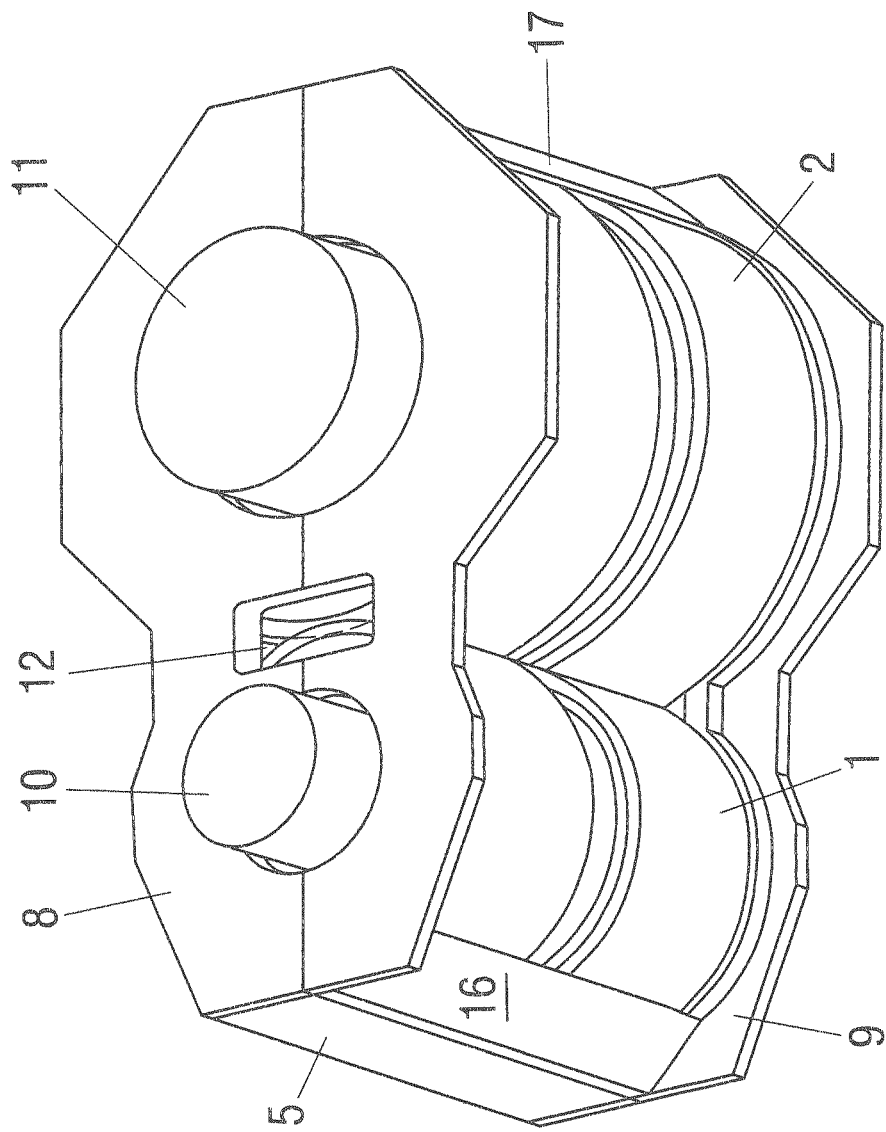
FIG. 2 shows an oblique plan view of the partially encapsulated spur gears from FIG. 1, but in this case equipped with additional optional side covers.

FIG. 2 illustrates, in a perspective view of an embodiment with partial encapsulation, side covers 8, 9 which are connected by way of example laterally to the enveloping wall 5. As can be seen, said side covers also cover that part of the outer circumference of the spur gears 1, 2 which projects downward out of the enveloping wall 5.

However, in a particularly advantageous embodiment that is not illustrated in FIG. 2, provision is made for the enveloping wall 5 to be designed to be free from said side covers 8, 9, as depicted by way of example in FIGS. 6 to 13 and also provided for FIGS. 3 to 5, or for said enveloping wall to be designed to extend only over a partial region of the radial extent of the spur gears 1, 2 proceeding from the radial inner circumference of the enveloping wall 5 in the region of the outer diameter. In this latter case, the side covers 8, 9 are formed as separate components, or else are formed integrally with the radial wall region.

The enveloping wall 5 thus describes at least one single-part or multi-part wall region which, in the circumferential direction, encloses the spur gears 1, 2 at least partially in the circumferential direction so as to form a gap. Said wall region is characterized by an axial extent in relation to the direction of the profile of the axis of rotation of the spur gear 1, 2 respectively to be enclosed, which extent corresponds at least to the axial extent of the respective spur gear. Embodiments with an enveloping wall 5 which protrudes in the axial direction are likewise conceivable, and are also necessary in the case of lateral wall regions being provided.

The first spur gear 1 has a driving shaft 10 and the second spur gear 2 has a driven shaft 11. The two shafts 10, 11 are led through the side covers 8. In the case of a second spur gear 2 which drives the first spur gear 1, the shafts 10, 11 would be correspondingly interchanged.

Furthermore, in the embodiment as per FIG. 2, an opening 12 is provided in the side cover 8, and in particular also in the side cover 9, in the region of the mutual engagement of the toothings of the two spur gears 1, 2. Said opening serves for the discharge of coolant.

It can also be seen from FIG. 2 that, in the exemplary embodiment shown, each spur gear 1, 2 has two toothings which, in an axial direction, are positioned adjacent to one another and in particular with a spacing to one another in order to form a double toothing, in particular a double helical toothing.

FIG. 3 illustrates, once again schematically, an embodiment of a spur gear transmission according to the invention as per a preferred embodiment with partial encapsulation. Here, the enveloping wall 5 encloses in each case the upper half of the two spur gears 1, 2 and thus ends in a plane running horizontally through the axes of rotation 4, 5, see the dashed line.

The oil sump 19 is schematically illustrated at the bottom in the transmission housing 13 that encloses the two spur gears 1, 2 and the enveloping wall 5. It can be seen that those parts 20 of the spur gears 1, 2 which project out of the enveloping wall 5, that is to say the parts 20 positioned below the plane which is shown by the dashed line and in which the enveloping wall 5 ends, have a spacing D to the transmission housing 13 and also a spacing d to the oil sump 19, wherein, in said region, the two spur gears 1, 2 are positioned freely in relation to the oil sump 19, in particular without interposed components that cover the spur gears 1, 2. It is thus possible for lubricating oil to be easily discharged from the toothings of the spur gears 1, 2 into the oil sump 19, in particular by being freely sprayed out.

FIG. 4 shows an alternative embodiment in a similar illustration to that in FIG. 3. By contrast, in this case, the spur gears 1, 2 are positioned one above the other. With regard to the illustrated components, reference is made to FIG. 3 and the corresponding reference designations.

In FIG. 4, the upper spur gear, in this case the second spur gear 2, is enclosed over three quarters of its circumference, that is to say approximately over 270°, by the enveloping wall 5, and the lower spur gear, in this case the first spur gear 1, is enclosed over one quarter of its circumference, that is to say of approximately 90°, by the enveloping wall 5. Accordingly, the lower half of the first spur gear 1 projects downward out of the enveloping wall 5, in this case see again the dashed line that indicates the plane in which the enveloping wall 5 ends from above. The spacings d, D of the lower spur gear 1 to the oil sump 19 and to the transmission housing 13 respectively also again amount, as in the embodiment as per FIG. 3, to a multiple of the spacing between the spur gears 1, 2 and the enveloping wall 5 in the region of the enclosure or encapsulation.

FIG. 5 illustrates an important aspect of the present invention, specifically the separation of the cooling of the spur gears 1, 2 from the lubrication of the spur gears 1, 2. Accordingly, a first oil volume flow for cooling the spur gears 1, 2 is conducted through the enveloping wall 5. Said first oil volume flow is denoted by 21. For the delivery of said first oil volume flow 21, a first oil pump 22 is schematically indicated, which delivers the oil out of the oil sump 19. This is however not imperatively necessary; it would also be possible for some other coolant or some other delivery means to be provided. It is alternatively or additionally possible, as indicated by the dashed line, for the enveloping wall 5 to also be called by being sprinkled with the first oil volume flow 21. In the present case, a cooling duct 28 is schematically illustrated which runs within the enveloping wall 5. As can be seen, the profile of the cooling duct 28 follows the profile of the inner contour of the enveloping wall 5, though this is not imperatively necessary. It would also be possible for a cooling duct 28 of said type to be omitted entirely, and for the coolant to be conducted only along the outer surface of the enveloping wall 5.

For the lubrication of the spur gears 1, 2, a second oil volume flow 23 is conducted into the toothings of the spur gears 1, 2, advantageously into the engagement region 15 of the toothings, for example through one or more openings 12 as illustrated in FIG. 2. Said second oil volume flow 23 is for example delivered out of the oil sump 19 by means of a second oil pump 24. It is however also possible here, too, for some other delivery means or some other source to be used.

The components of features relating to the lubrication of the spur gears 1, 2 form a lubricating device 26, whereas the components and features relating to the cooling of the enveloping wall 5, and thus indirectly of the spur gears 1, 2, form a cooling device 27.

The first oil volume flow 21 and the second oil volume flow 23 may also be delivered by means of a common oil pump, wherein in all cases, however, the first oil volume flow 21 is advantageously greater than, and in particular amounts to a multiple of, the second oil volume flow 23.

The second oil volume flow 23 can advantageously be sprayed freely from the spur gears 1, 2, whereas the first oil volume flow 21 generally emerges from the enveloping wall 5 through at least one corresponding opening or, in the case of sprinkling of the enveloping wall 5, runs or drips off the enveloping wall 5.

By means of the active cooling of the enveloping wall 5, the spur gears 1, 2 can, by contrast to direct cooling, be cooled indirectly by heat transfer via the ring-shaped gaps 6, 7 into the enveloping wall 5. This makes it possible for a relatively small lubricating oil volume flow, in this case second oil volume flow 23, to be delivered through the ring-shaped gaps 6, 7 and/or the engagement region 15 of the toothing, which reduces the losses.

Cooling of the enveloping wall 5 by means of cooling ribs 25 on the outside of the enveloping wall 5 is also schematically shown in the exemplary embodiment.

In FIGS. 6 to 13, the illustrated enveloping wall 5 is formed with an axial extent which corresponds at least to the axial extent of a spur gear 1 or 2, wherein the enveloping wall 5 is, as viewed in the axial direction, arranged within the region of extent of the spur gear 1 or 2. A lateral protrusion in the axial direction would also be conceivable. The enveloping wall 5 is, as viewed in the radial direction, arranged spaced apart from the outer circumference of the respective spur gear 1 or 2.

FIG. 6 shows once again the positioning of the enveloping wall 5 within the transmission housing 13, of which only the lower part is illustrated. Again, the corresponding reference designations for the various components are used, wherein a repeated description will be omitted.

Figure 6:
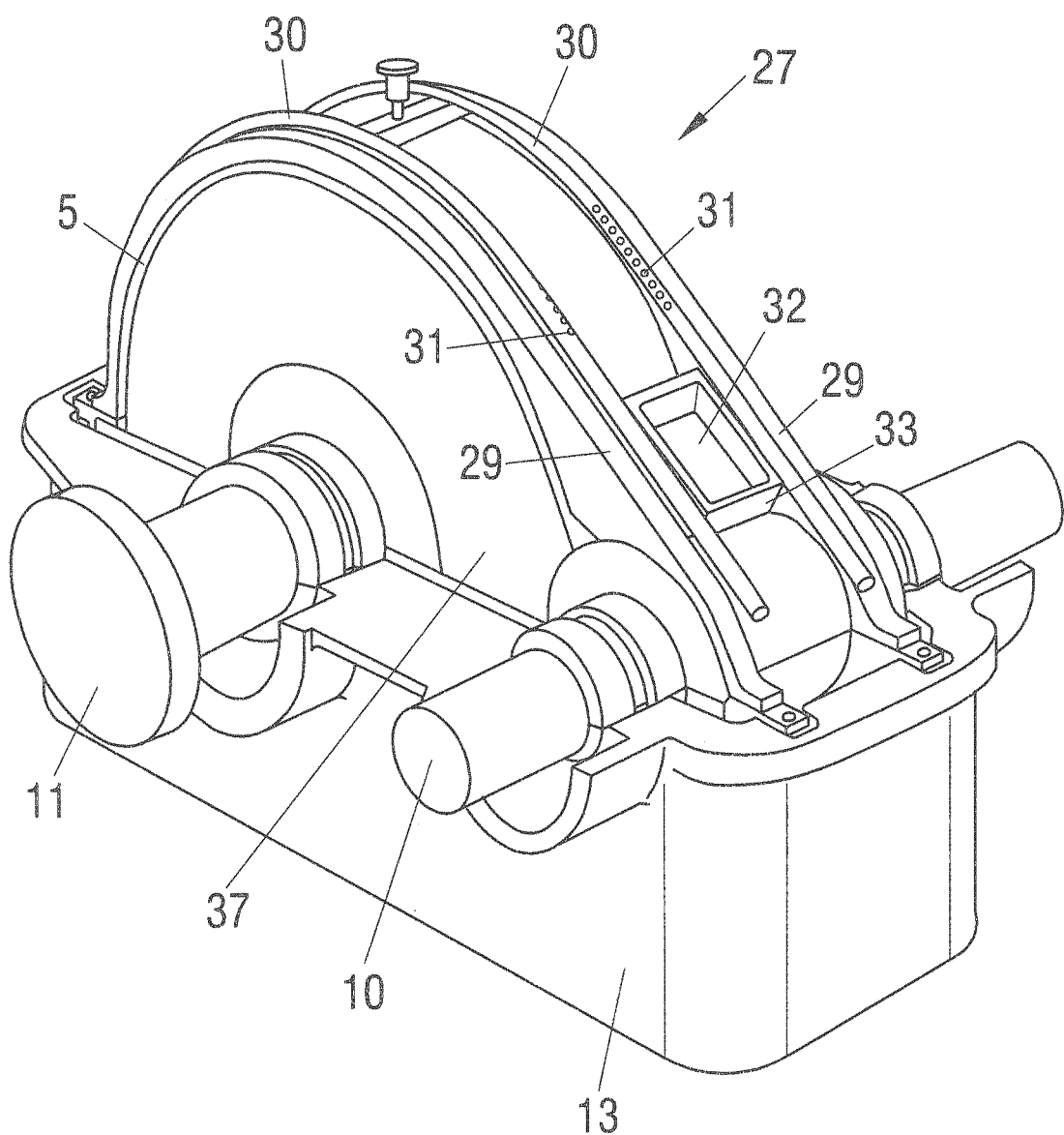
FIG. 6 shows an exemplary embodiment of a cooling device with sprinkling device and webs on the enveloping wall.

In the exemplary embodiment shown in FIG. 6, the cooling device comprises two coolant-conducting pipes 30 which run along the outer side of the enveloping wall 5 and which, in the exemplary embodiment shown, are situated opposite one another in parallel, though this is not imperatively necessary. The pipes 30 advantageously run on both sides approximately radially outside the faith sides of the spur gears 1, 2. The pipes 30 have outlet openings 31 via which coolant can be sprayed or sprinkled onto the outer circumference of the enveloping wall 5. Owing to the arrangement of the pipes 30 and of the outlet opening 31, the outer circumference of the enveloping wall 5 is wetted uniformly, and the sprayed-on coolant runs off along the outer circumference on the outside of the enveloping wall 5, absorbing heat from the enveloping wall 5 in the process.

To prevent the coolant from flowing or dripping laterally off the enveloping wall 5 across the face sides of the spur gears 1, 2 onto rotating parts, in particular the shafts 10, 11, webs 29 are provided which prevent this. The webs 29 firstly impart stability to the enveloping wall 5, and secondly constitute a barrier for the coolant flowing on the outside of the enveloping wall 5. The height of the webs 29 is advantageously dimensioned such that said webs are at least as tall as the pipes 30, that is to say extend as far as the top side thereof.

In the region above the engagement region of the toothings, a maintenance opening 32 is provided in the enveloping wall 5, which maintenance opening is enclosed by side walls 33 such that no coolant that flows over the outer side of the enveloping wall 5 can enter the maintenance opening 32. Although not illustrated here, the maintenance opening 32 may be closable by means of a cover. This is however not imperatively necessary.

In FIG. 6, it is also possible to see side panels 37 as shield panels, which are positioned with a spacing to the face sides of the spur gears 1, 2, and which are in particular inserted or mounted in the lower housing half.

Figure 7:
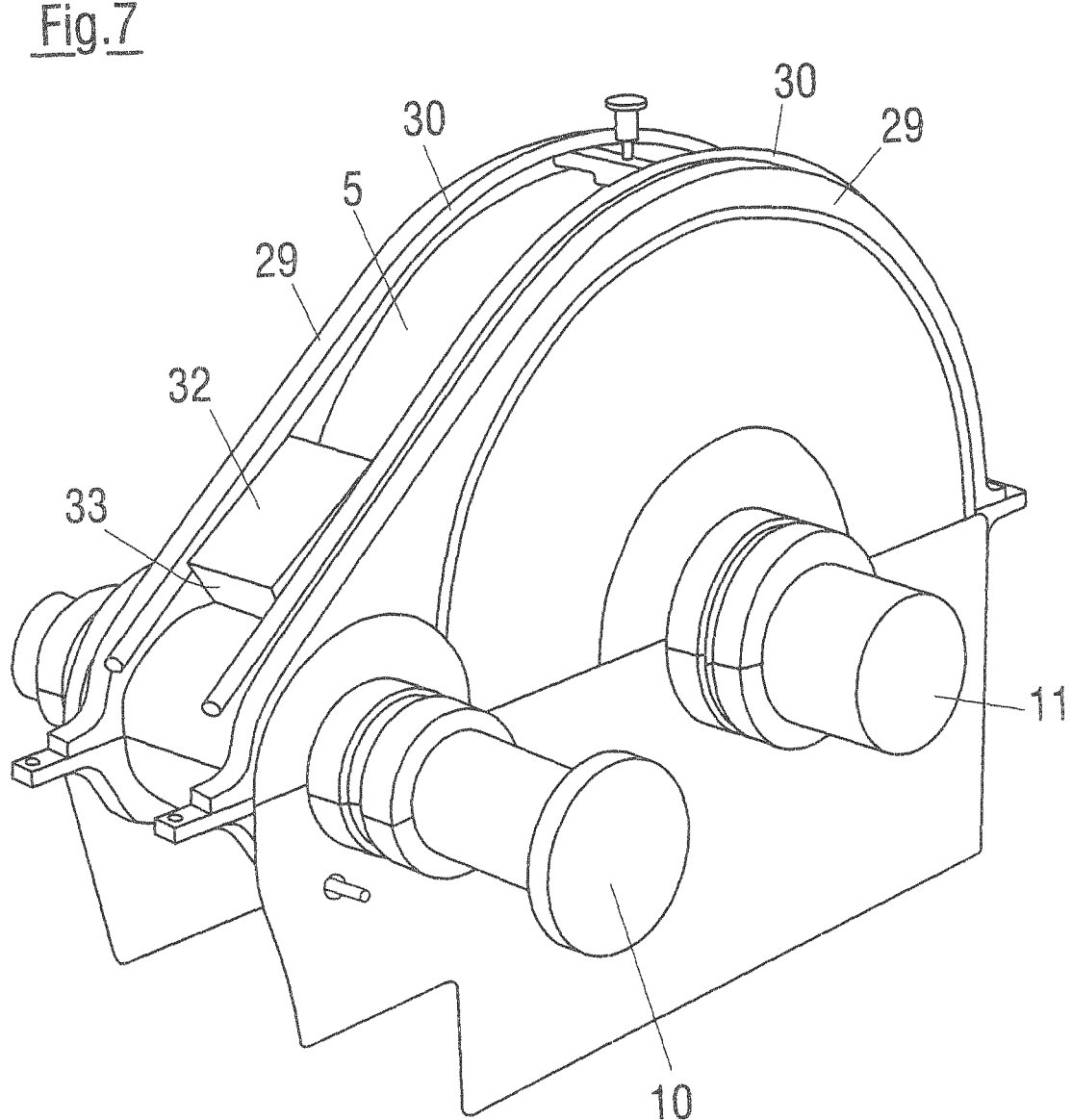
FIG. 7 shows the embodiment as per FIG. 6 but without a transmission housing.

FIG. 7 illustrates the embodiment of FIG. 6 once again without a transmission housing. It can be seen in particular that the maintenance opening 32 is provided above the engagement region of the toothings, in which the enveloping wall 5 has a concave contour to form the ring-shaped gaps.

Figure 8:
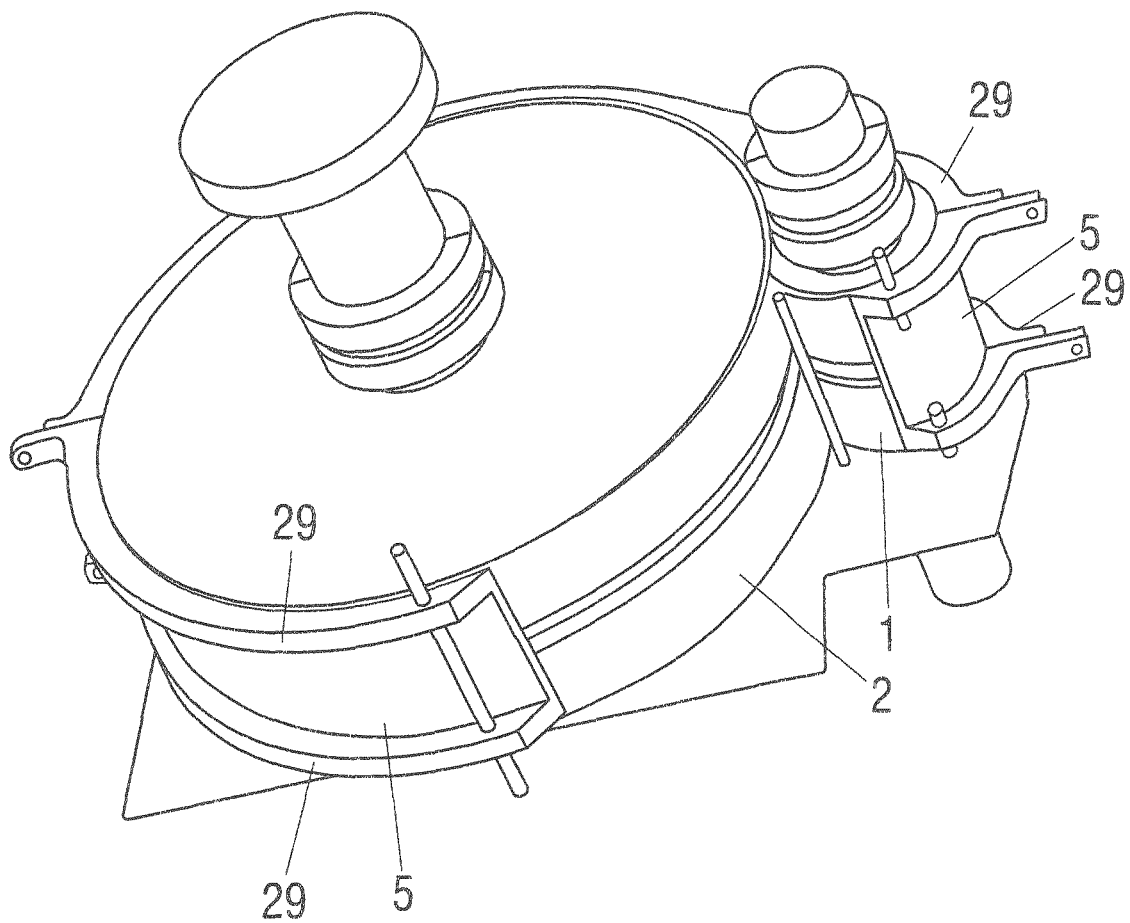
FIG. 8 shows a three-dimensional plan view obliquely downward onto the enveloping wall.

It can be clearly seen once again from FIG. 8 that the enveloping wall 5, which has the webs 29 also on its underside, does not fully enclose the spur gears 1, 2. At the same time, it can be seen that the pipes 30 illustrated in FIGS. 6 and 7 do not extend as far as the underside of the enveloping wall 5, but rather extend only in the upper region thereof.

Figure 9:
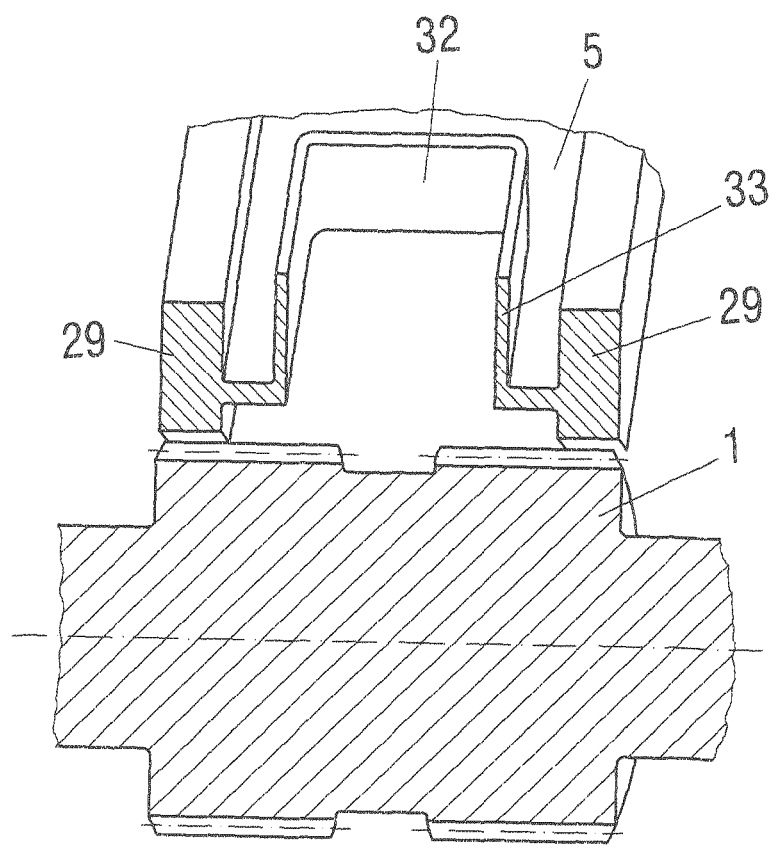
FIG. 9 shows a cross section through the enveloping wall in the region of a maintenance opening.
Figure 10:
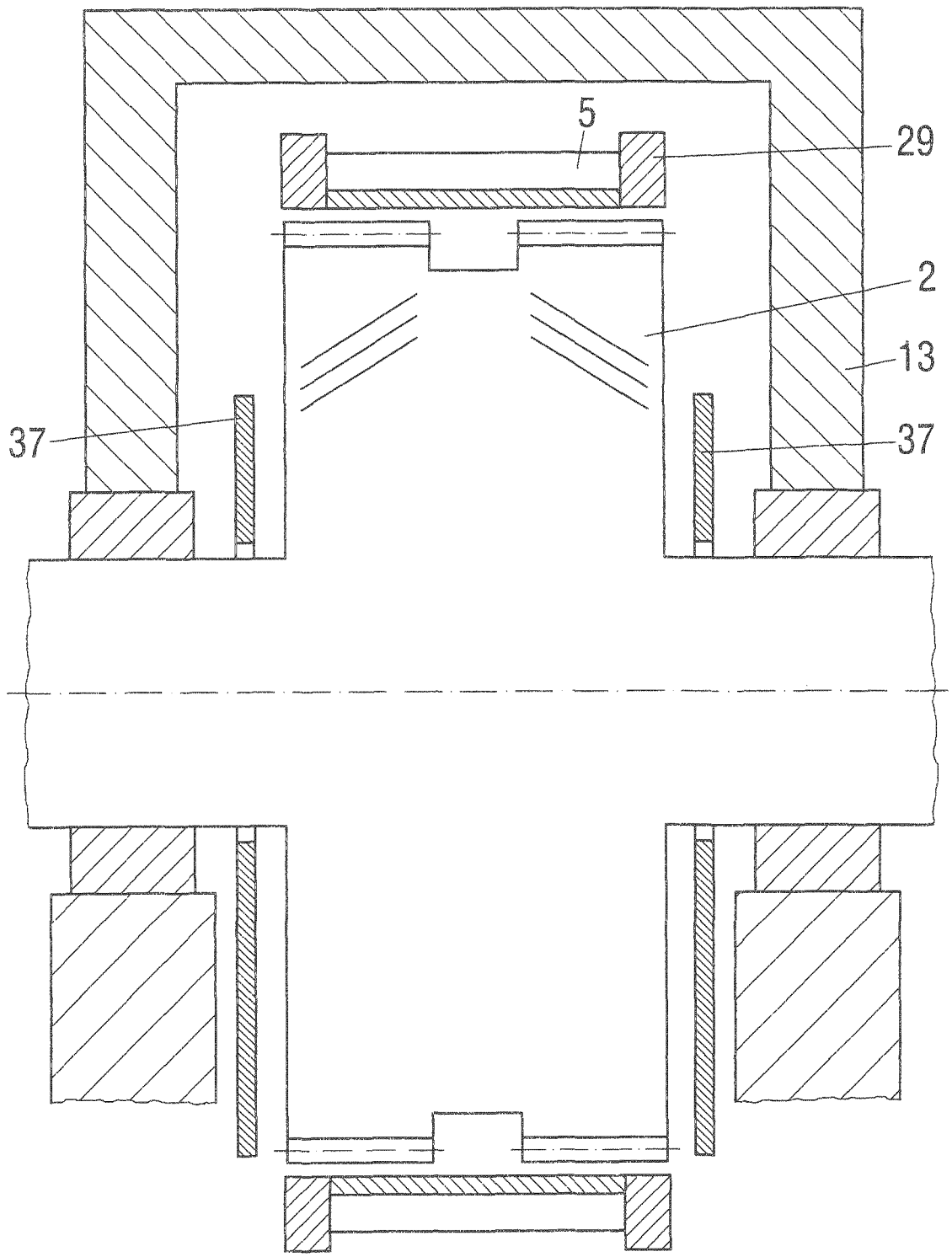
FIG. 10 shows a further cross section through the enveloping wall, the transmission housing and a spur gear.

FIGS. 9 and 10 show sectional illustrations through the spur gear transmission and in particular the enveloping wall 5.

FIG. 9 shows once again the webs 29 and the side walls 33 of the maintenance opening 32. As can be seen, the webs 29 may advantageously also protrude radially inward from the enveloping wall 5.

FIG. 10 shows a corresponding but more comprehensive section in the region of the spur gear 2, but outside the maintenance opening. Furthermore, in this exemplary embodiment, the webs 29 protrude only radially outward from the enveloping wall 5. This could however also be different.

Also visible are side panels 37 which are arranged with a spacing to the spur gear 2, in particular to the face sides of the spur gear 2, and which are intended to serve for shielding the transmission from the bearings. A passage of bearing oil into the enveloping wall 5 or into the ring-shaped gaps formed between said enveloping wall and the spur gears 1, 2 is reliably prevented.

Figure 11:
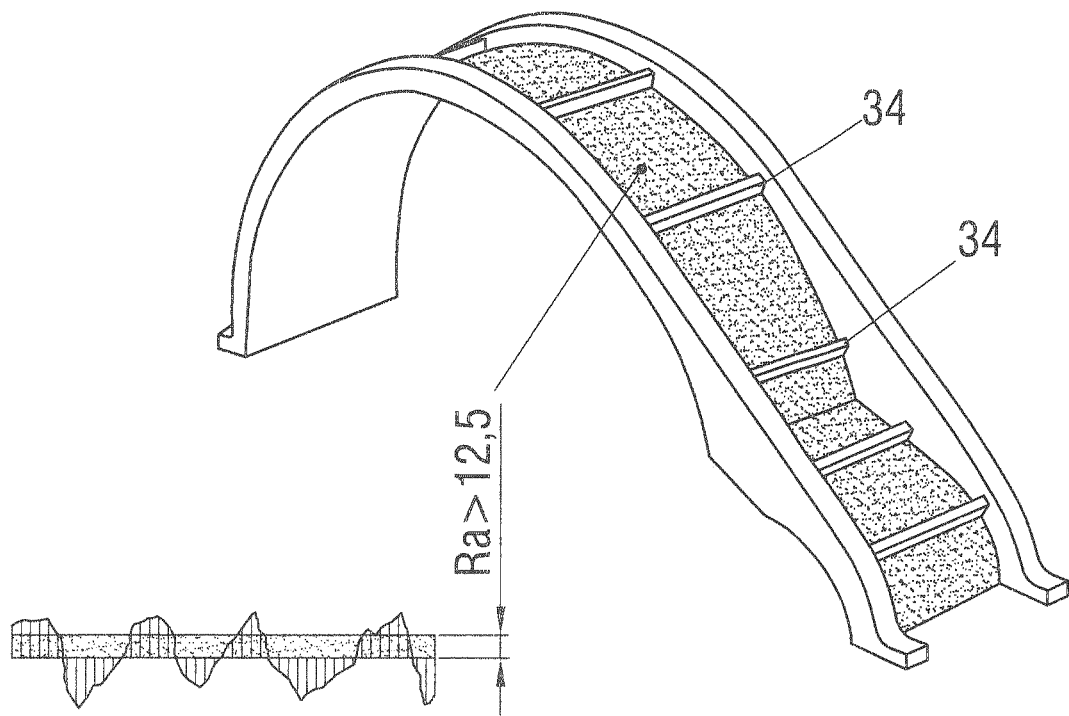
FIG. 11 shows a possible profile surface of the enveloping wall for reducing the flow speed of the coolant flow.

FIG. 11 shows a possible design of the outer surface of the enveloping wall 5 for reducing a flow speed of the coolant along the outer surface of the enveloping wall 5. For example, projections or steps 34 are provided over which the sprayed-on coolant must flow. Also, the outer surface, which is wetted with the coolant, of the enveloping wall 5 is of particularly rough design, for example with a mean roughness depth $R_a$ of 12.5 or greater.

Figure 12:
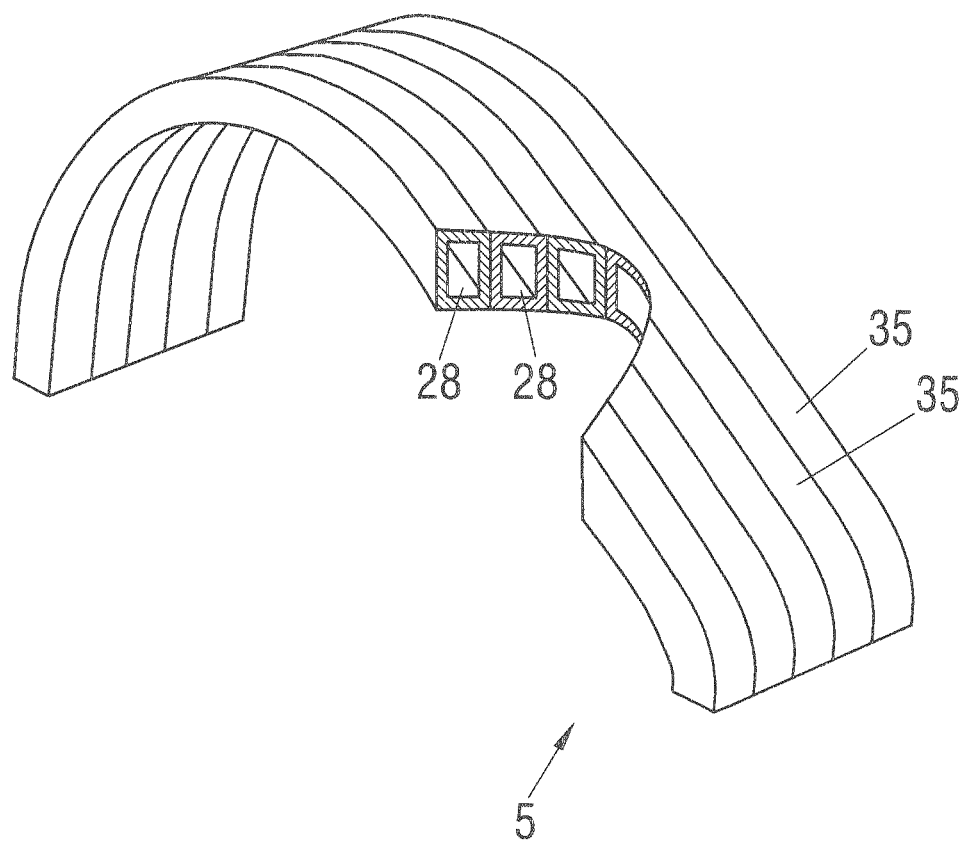
FIG. 12 shows an embodiment of the enveloping wall with hollow profiles for forming the cooling ducts within the enveloping wall.

In the exemplary embodiment as per FIG. 12, the enveloping wall 5 is formed by one or more hollow profiles 35, each of which has one or more cooling ducts 28. Accordingly, a single hollow profile 35 with a single cooling duct 28 may be provided for forming the enveloping wall 5, or at least of that section thereof which is to be cooled. However, a hollow profile 35 with multiple cooling ducts, in particular cooling ducts directed parallel to one another, may also be provided. Finally, it is also possible for multiple hollow profiles with in each case one or more cooling ducts to be joined together to form the enveloping wall 5.

Figure 13:
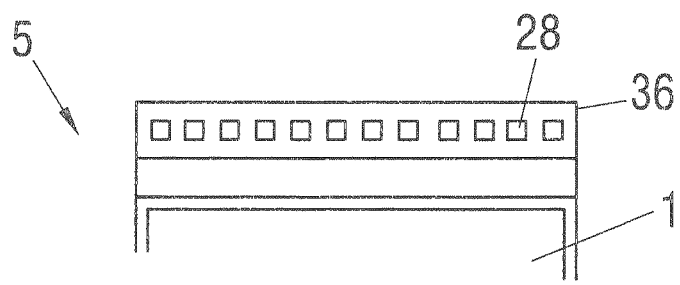
FIG. 13 shows an embodiment with a heat exchanger integrated in the enveloping wall.

In the exemplary embodiment as per FIG. 12, the enveloping wall 5 thus constitutes, as it were, a heat exchanger. Alternatively, as illustrated in FIG. 13, it is also possible for a heat exchanger to be connected to the outside of the enveloping wall 5, in order for heat to be supplied to the heat exchanger 36 by heat conduction, via an in particular solid part of the enveloping wall 5 that forms the inner contour, and subsequently discharged by means of the coolant flowing through the cooling ducts 28.

The possibilities according to the invention for the delivery and conducting of cooling oil in the case of an enveloping wall with partial encapsulation of the spur gears in a circumferential direction are particularly advantageous for a design of the enveloping wall 5 with, or free from, wall regions arranged laterally with respect to the spur gear 1, 2, that is to say side panels 8, 9, which may be formed integrally with or else connected to the wall region running in the circumferential direction.

Whereas FIGS. 1 to 10 show embodiments according to the invention of a spur gear transmission with two spur gears 1, 2 in engagement with one another, it is self-evident that this type of partial encapsulation with cooling oil delivery may likewise be used for embodiments of spur gear transmissions with multiple spur gears. Such multi-shaft spur gear transmissions are, in a particularly advantageous application, designed as so-called integral transmissions, and are used in geared turbomachines or so-called geared compressors.

Examples of multi-shaft spur gear transmissions with at least three spur gears are depicted in simplified schematic form in FIGS. 14 to 16*a* and 17. An example of a geared turbomachine 47 is depicted in FIG. 16*b*. The transmission structures may be designed with the abovementioned coolant conducting configurations. To avoid repetitions, the illustration and description of these will be omitted, and only the exemplary transmission structures will be described.

Figure 14:
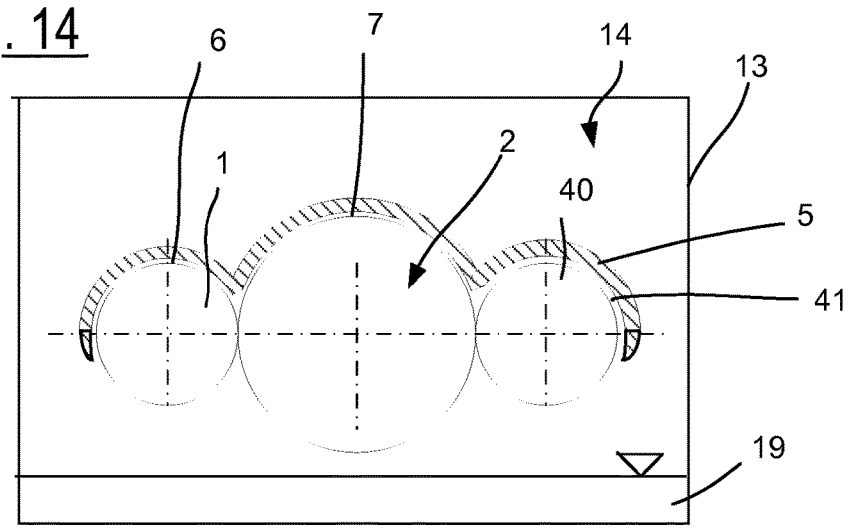
FIG. 14 shows a three-shaft design of a spur gear transmission.

By way of example, FIG. 14 shows an embodiment with a three-shaft spur gear transmission, wherein here, two spur gears in the form of pinions are in engagement with one large gear. The large gear is formed by the spur gear 2, whereas the spur gear 1 is formed by a pinion in engagement therewith. The further spur gear 40 that is in engagement with the large gear is likewise designed as a pinion. Here, the pinions may be driving or driven pinions, or both pinions are driven by means of the large gear. The ring-shaped gap formed between the outer circumference of the spur gear 40 and inner circumference of the enveloping wall 5 is denoted by 41. The individual spur gears are arranged with their axes of rotation in a plane. The mounting can therefore be realized in a planar parting joint of the transmission housing 13. The enveloping wall 5 encloses the individual spur gears 1, 2, 40 in each case around a partial region of their outer circumference in the circumferential direction, such that the pinions and also the large gear project out of the enveloping wall 5 downward, or in a manner pointing in the direction of the oil sump 19, as viewed in a vertical direction.

Figure 15:
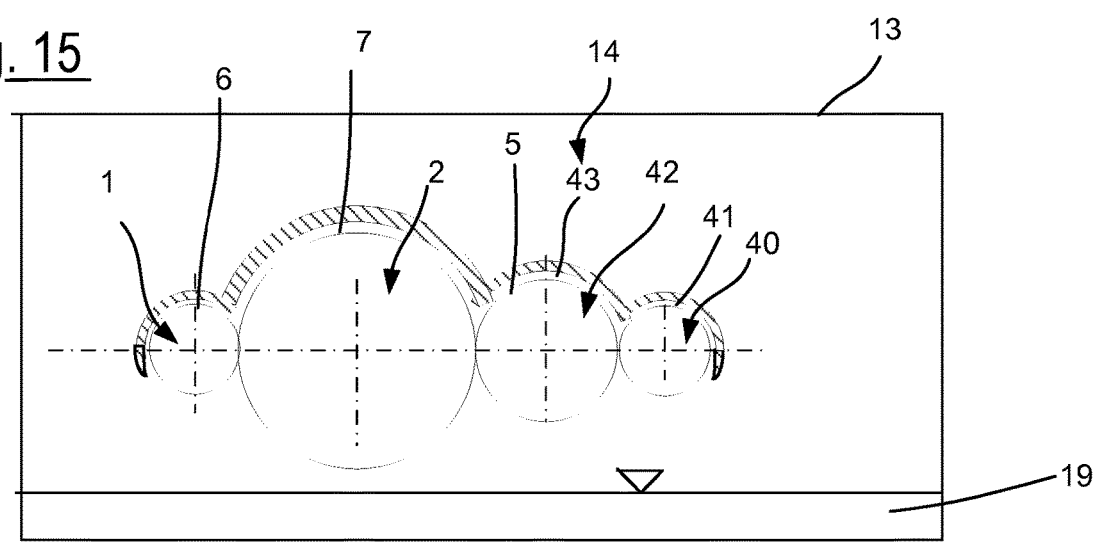
FIG. 15 shows, by way of example, a four-shaft design of a spur gear transmission.

FIG. 15 illustrates a refinement of an embodiment as per FIG. 14 with axes of rotation of the spur gears of a multi-shaft spur gear transmission arranged in a parting joint of the housing 13. In the illustrated case, between the spur gear 40 in the form of the pinion and the spur gear 2 formed as a large gear, there is provided a further spur gear 42 in the form of an intermediate gear. Said intermediate gear is preferably coupled to a driving shaft. The two pinions function as output pinions. Other configurations are conceivable depending on the usage situation.

Figure 16A:
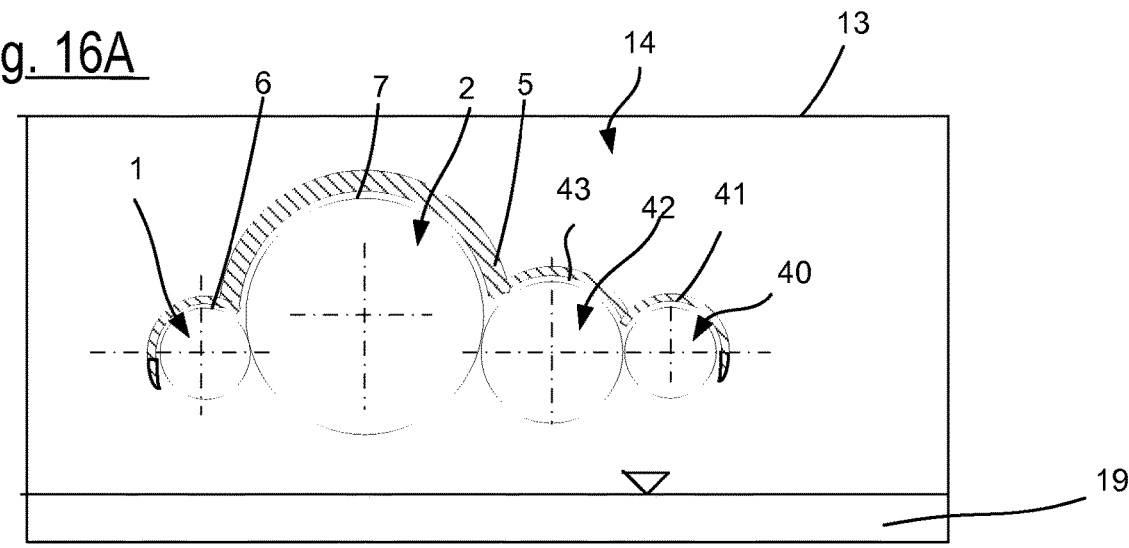
FIG. 16a shows a design as per FIG. 15 with a vertically offset spur gear.
Figure 16B:
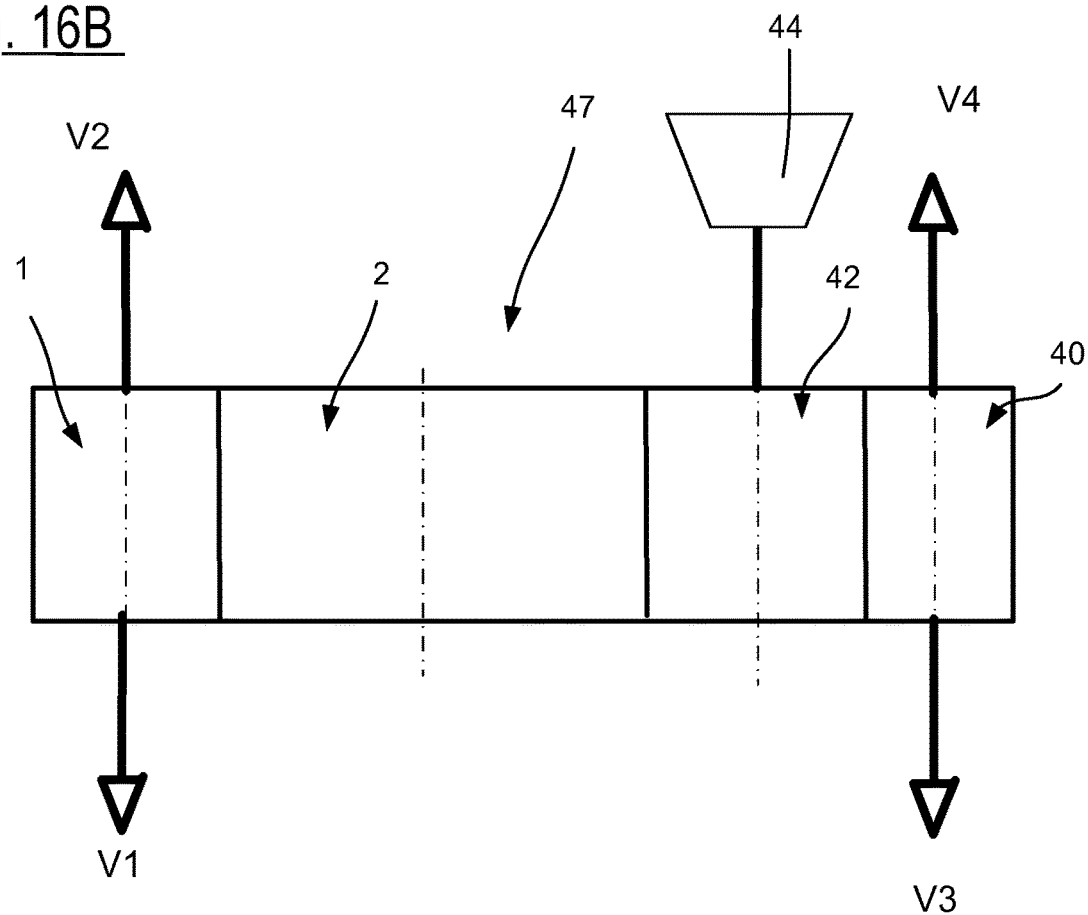
FIG. 16b shows the embodiment of the spur gear transmission is an integral transmission in a geared turbomachine.

FIG. 16*a* illustrates a refinement of an embodiment as per FIG. 15, wherein the large gear, as viewed in an axial direction in an installed position, axis of rotation of the large gear arranged offset with respect to the parting joint for the mounting of the spur gears 1, 40, 42 (pinions and intermediate gear). FIG. 16*b* illustrates, for such a transmission embodiment, the use in a geared turbomachine 47. This, by means of the spur gear transmission, integrates driving and/or driven assemblies to form a machine train. Steam turbines, gas turbines, expanders and engines are possible individually or in combination as driving assemblies, and compressors and generators are possible individually or in combination as driven assemblies. The geared turbomachines are thus formed as a geared compressor or expander installation or a combination of both. In the illustrated case, compressors V1 to V4 coupled to each of the pinion shafts connected to the pinions are provided as driven assemblies, whereas a driving machine 44 drives these via the spur gear 42 in the form of an intermediate gear.

Figure 17:
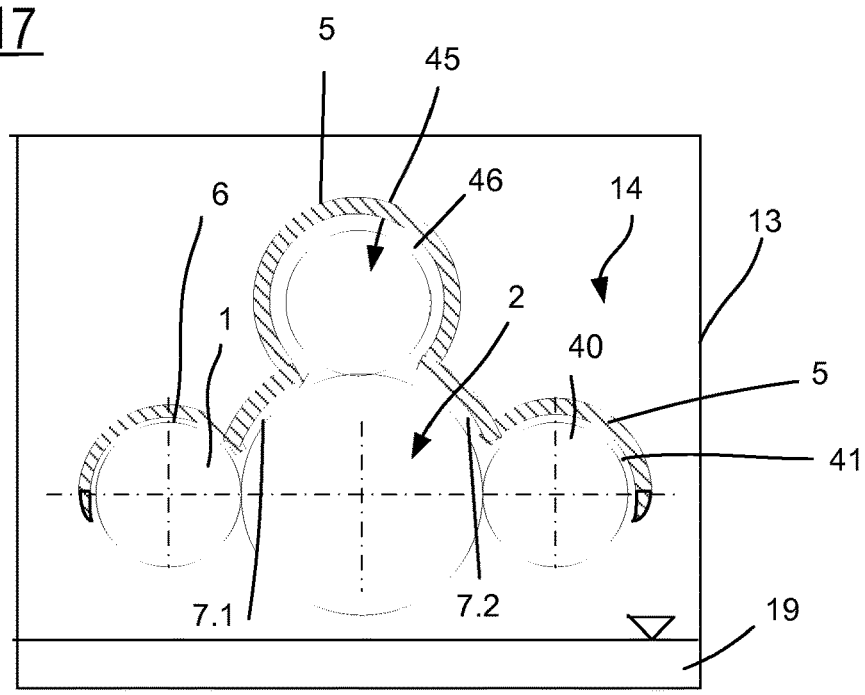
FIG. 17 illustrates, by way of example, a further embodiment of a multi-shaft spur gear transmission with partial encapsulation.

FIG. 17 illustrates, by way of example, a refinement of an embodiment as per FIG. 14, in which a further spur gear 45, which is offset with respect to the other spur gears 1, 40 and 2 and which is in the form of a pinion, is in engagement with the spur gear 2. The axes of rotation of the individual spur gears are thus arranged in different planes. In this case, too, the enveloping wall 5 encloses the spur gear train, wherein the in each case outer spur gears as viewed in the axial direction in the installed position are enclosed by said enveloping wall in the circumferential direction such that a partial region of said spur gears projects out in the direction of the oil sump 19.

LIST OF REFERENCE DESIGNATIONS

1 Spur gear
2 Spur gear
3 Axis of rotation
4 Axis of rotation
5 Enveloping wall
6 Ring-shaped gap
7, 7.1, 7.2 Ring-shaped gap
8 Side cover
9 Side cover
10 Shaft
11 Shaft
12 Opening
13 Transmission housing
14 Interior space
15 Engagement region of the toothings
16 Wedge
17 Wedge
18 Vacuum pump
19 Oil sump
20 Projecting part
21 First oil volume flow
22 First oil pump
23 Second oil volume flow
24 Second oil pump
25 Cooling ribs
26 Lubricating device
27 Cooling device
28 Cooling duct
29 Web
30 Pipe
31 Outlet opening
32 Maintenance opening
33 Side wall
34 Steps
35 Hollow profile
36 Heat exchanger
37 Side panel
40 Spur gear, in particular pinion 41 Ring-shaped gap
42 Spur gear, in particular intermediate gear
43 Ring-shaped gap
44 Drive machine
45 Spur gear, in particular pinion
46 Ring-shaped gap
47 Geared turbomachine

What is claimed is:

1. A spur gear transmission, comprising:
at least two toothed spur gears rotatably disposed about a respective axis of rotation and having toothings in meshing engagement with one another, each said spur gear having a given outer diameter;
an enveloping wall at least partially enclosing said two spur gears in a circumferential direction and in a direction of the axis of rotation;
said enveloping wall having an inner contour adapted to the given outer diameters of said spur gears, forming two ring-shaped gaps between said enveloping wall and said spur gears that merge into one another, with each said ring-shaped gap being arranged at least substantially concentrically with respect to a respective said axis of rotation;
a lubricating device configured to conduct a lubricant flow into said toothings of said spur gears; and
a cooling device configured to conduct a coolant flow through one or more cooling ducts running within said enveloping wall and/or along an outside of said enveloping wall; and
wherein said enveloping wall has a heat-conducting part forming the inner contour, and wherein a heat exchanger is externally connected to said part or integrally adjoins said part, and wherein said one or more cooling ducts is formed in said heat exchanger.

2. The spur gear transmission according to claim 1, wherein said cooling device comprises a sprinkling device configured to sprinkle or spray coolant onto said enveloping wall from the outside.

3. The spur gear transmission according to claim 1, wherein said enveloping wall has an outer side formed with webs disposed to delimit a flow path of the coolant flow laterally in a flow direction.

4. The spur gear transmission according to claim 1, wherein said cooling device includes at least one pipe disposed to run along an outer side of said enveloping wall and formed with a multiplicity of outlet openings spaced apart from one another and serving to dispense and distribute the coolant flow onto the outside of said enveloping wall.

5. The spur gear transmission according to claim 1, wherein a mass flow and/or a volume flow of the coolant flow of said cooling device and mass flow and/or a volume flow of the lubricant flow of said lubricating device can be set separately from one another and independently of one another.

6. The spur gear transmission according to claim 1, wherein the coolant flow comprises a first oil volume flow and the lubricant flow comprises a second oil volume flow, and the first and second oil volume flows are delivered out of a common oil reservoir or out of mutually separate oil reservoirs.

7. The spur gear transmission according to claim 1, wherein said enveloping wall is formed with at least one cooling duct that runs in a direction of the axes of rotation or at an angle relative to the axes of rotation within said enveloping wall and which, in terms of a profile thereof, follows the inner contour of said enveloping wall, at least in sections thereof.

8. The spur gear transmission according to claim 1, wherein said heat exchanger is a plate-type heat exchanger or a pipe bundle heat exchanger.

9. The spur gear transmission according to claim 1, wherein said enveloping wall, on the outer side and in a region flowed over by the coolant flow, has a profiled surface for reducing a flow speed of the coolant flow.

10. The spur gear transmission according to claim 1, which comprises an oil sump disposed below said enveloping wall, and wherein the coolant flow runs off freely into said oil sump.

11. The spur gear transmission according to claim 1, wherein said enveloping wall has an outer side formed with webs disposed to delimit a flow path of the coolant flow laterally in a flow direction, wherein said webs are elevated in a radial direction of the axes of rotation relative to an outer surface of said enveloping wall that is subject to the coolant flow, and wherein said webs are configured to prevent a flow of coolant over side faces, facing in the direction of the axes of rotation, of said enveloping wall.

12. The spur gear transmission according to claim 1, wherein an outer surface of said enveloping wall is formed with a maintenance opening in a region that is flowed over by the coolant flow, and said maintenance opening is enclosed by shaft-shaped side walls that project from the outer surface and prevent an ingress of the coolant flow into said maintenance opening.

13. The spur gear transmission according to claim 12, wherein said maintenance opening is a closable maintenance opening.

14. The spur gear transmission according to claim 1, wherein said enveloping wall encloses said at least two spur gears in a circumferential direction only over a portion of a circumference thereof, wherein a part of the outer circumference of said two spur gears, or of at least one of said two spur gears projects outward from said enveloping wall, and wherein that part of said spur gear or spur gears which projects out of said enveloping wall is positioned at an underside of said spur gears.

15. The spur gear transmission according to claim 14, wherein that part of the outer circumference of said two spur gears which projects out of said enveloping wall extends over an arc between 10° and 180°.

16. The spur gear transmission according to claim 14, wherein said enveloping wall has an axial extent that is equal to, or greater than, an axial extent of said spur gear that is at least partially enclosed.

17. The spur gear transmission according to claim 14, wherein:
said enveloping wall is free from side covers which are arranged in an axial direction with respect to said spur gear and which are connected to that part of said enveloping wall which runs in the circumferential direction around the respective said spur gear; or
said enveloping wall is formed by a wall region running in a circumferential direction around the respective said spur gear and by side panels which are connected to, or formed integrally with, said wall region and which are arranged axially spaced apart from said spur gear, wherein the individual side panel is, as viewed in a radial direction, formed with a radial extent in the range of the outer diameter of the respective spur gear.

18. The spur gear transmission according to claim 14, wherein ring-shaped gaps have a thickness of 1 to 10 mm.

19. The spur gear transmission according to claim 14, wherein, at at least one circumferential end or at both circumferential ends in a circumferential direction of said spur gears, said enveloping wall has a wedge-shaped narrowing and/or is arranged with a smaller spacing distance to said toothing of the respective said spur gear than in a remaining region of the circumference covered by said enveloping wall.

20. The spur gear transmission according to claim 1, wherein said at least two spur gears are a multiplicity of spur gears each rotatably disposed about an axis of rotation, wherein each of said spur gears is in meshing engagement with at least one other of said spur gears, and said enveloping wall is formed so as to run around at least a partial region of each of said spur gears, and wherein the axes of rotation of a number of said spur gears are arranged in a plane.

21. A geared turbomachine, comprising:
   a plurality of driving and/or driven assemblies;
   a spur gear transmission according to claim 1 having individual shafts connected to said spur gears and integrating said assemblies to form a machine train by connection to the individual said shafts.

22. The geared turbomachine according to claim 21, wherein said driving and/or driven assembly connected to said shafts is an element selected from the group consisting of an impeller of a compressor stage and impeller of an expander stage.

* * * * *